United States Patent Office 3,079,311
Patented Feb. 26, 1963

3,079,311
METHOD OF PREPARING TERTIARY PHOSPHINES
William P. Hettinger, Jr., Dolton, Ill., assignor to Nalco Chemical Company, Chicago, Ill., a corporation of Delaware
No Drawing. Filed Feb. 20, 1961, Ser. No. 90,215
6 Claims. (Cl. 204—59)

Tertiary phosphines have received attention in various fields of industrial chemistry. Triethyl phosphine possesses catalytic activity in the polymerization of acrolein and acrylonitrile. Triphenyl phosphine has been reported as being a useful catalytic reagent in the polymerization of formaldehyde as well as having a certain effectiveness in preventing the corrosion of metal surfaces contacting certain types of petroleum hydrocarbon oils. With this increased employment of tertiary phosphines in industrial applications it is important that new and improved preparative techniques be made available to industrial chemists and manufacturers whereby these compounds may be made more readily available.

An exhaustive review of the conventional synthetic procedures used in making tertiary phosphines is discussed in the well-known work, "Organophosphorous Compounds" by Gennady N. Kosolapoff, John Wyley and Sons, Inc. (1950). In this scholarly treatise it is pointed out that phosphines, particularly tertiary phosphines, may be prepared from numerous organic compounds and a variety of inorganic phosphorous materials. Thus, alkali metal phosphides may be reacted with organic halides to produce substituted phosphines. Another method is the reaction of secondary or tertiary phosphines directly with alkyl halides. A classic method reported by Kosolapoff resides in the reaction of phosphorous halides, e.g., phosphorous trichloride, with Grignard reagents.

While these illustrative preparative methods have been used for the synthesis of tertiary phosphines they are subject to several disadvantages. In some instances the yields of the tertiary phosphines are relatively low. In other cases, conventional reactions produce primary, secondary, and tertiary phosphines as a mixture, thereby requiring the need for distillation or other separatory technique for selectively obtaining the tertiary phosphine from the reaction mass.

It would be a valuable contribution to the art of preparing tertiary phosphines if it were possible to provide a synthetic technique for preparing these compounds which would result in good yields. Also valuable would be a method which is capable of preparing a large variety of tertiary phosphines. Of further benefit would be a preparative technique which would be simple to conduct and which would allow the preparation of both homogeneous phosphines as well as mixed phosphines. It therefore becomes an object of the invention to provide a new and improved synthetic technique for the preparation of tertiary phosphines.

Another object of the invention is to provide a simple preparative technique for the synthesis of tertiary phosphines which is capable of producing a large variety of tertiary phosphines in either of the homogeneous or mixed types without any radical departure being made from the basic process.

A specific object is to provide a radically different route for the preparation of tertiary phosphines which utilizes certain electrochemical phenomena which have not heretofore been employed in the preparation of these trivalent phosphorous compounds. Other objects will appear hereinafter.

In accordance with the invention, it has been found that tertiary phosphines may be prepared by electrolyzing a Grignard reagent in an organic solvent for the Grignard reagent using a phosphorous anode and an electrically conductive cathode. In this process the free hydrocarbon radicals derived from the Grignard reagent combine with the phosphorous of the anode to form the corresponding phosphine. Simply expressed, the phosphorous anode is sacrificial and is decomposed during the reaction to form the phosphine.

The process thus generally described is selective in that it preferentially prepares tertiary phosphines. This electrolysis technique allows a Grignard reagent having the formula RMgHalide to react with phosphorus to produce tertiary phosphines corresponding to the notation $R_3P$. In these formulae the designation R is an organic radical containing as its major components the elements carbon and hydrogen. In a preferred embodiment of the invention R represents an acyclic organic radical which contains not more than 18 carbon atoms.

While the invention may be employed to produce a variety of tertiary phosphines the R group of the Grignard reagent is most preferably an aliphatic hydrocarbon radical containing from 1 to 8 carbon atoms in chain length. Using the techniques of the invention it is possible that the radical $R_3$ may be a similar organic radical such as methyl or ethyl or it may be a mixed organic radical such as diethyl-methyl. Mixed organic tertiary phosphines will be discussed more fully hereinafter.

The only limitation upon the type of tertiary phosphines that may be produced resides in the type of Grignard reagent used in the reaction. For preparing tertiary phosphines by the practices of the invention such easily synthesized Grignard reagents as methyl magnesium chloride, isopropyl magnesium bromide, butyl magnesium chloride, amyl magnesium iodide, phenyl magnesium bromide, ethyl magnesium chloride, octyl magnesium bromide, nonyl magnesium bromide, isobutyl magnesium chloride and octadecyl magnesium bromide may be used. While any Grignard halides may be used to prepare the tertiary phosphines, the organo magnesium chlorides seem to give higher yields. A possible explanation for this phenomena is the superior electrical conductivity of the organo magnesium chloride solutions.

The sacrificial phosphorous anode may be formed of any of the several well-known allotropic forms of phosphorous. While either white, red, or so-called yellow phosphorous may be used as the anode material they do not represent a preferred species. While white or red phosphorous electrodes may be used in the practices of the invention they are not the best conductors of electricity to be found among phosphorous allotropes. High conductivity is, of course, a desirable electrode characteristic since this property permits the use of low voltages to cause the electro-chemical reactions to occur. The white phosphorous is the least desirable anode material since it is somewhat soluble in several of the inert solvents for the Grignard reagent.

It has been discovered that the most satisfactory phosphorous electrode is black phosphorous in either its crystalline or amorphous form. Black phosphorous may be readily prepared by subjecting white phosphorous to pressures of about $10^4$ g./sq. cm. and temperatures of about several hundred degrees centigrade. Such well-known pressure temperature techniques produce amorphous or black crystalline phosphorous. Where a solid sheet, rod or plate-like anode is used, the crystalline or black phosphorous may be formed into these shapes by subjecting it to treatment with pressures in excess of those used to produce starting black phosphorous. Such techniques are well known and are used in the production of carbon and graphite electrodes. Black phosphorous has the additional advantage of not being soluble in most of the solvents used for dissolving the Gignard reagent.

When it is desired to use the black phosphorous in the form of crystals, pellets, or powders, or to use white or red phosphorous in the practices of the invention it is possible to place these materials in an insulated porous container with a non-reactive electrical conductor thereby allowing the particles to enter into the reaction.

The cathode may be constructed of any non-reactive conductor such as, for example, iron or platinum, although it is also possible to use a phosphorous cathode of a type similar to the phosphorous anode. When a phosphorous cathode is used a reversal of the current flow will cause the anode to become the cathode thus prolonging electrode life. During the electrolysis reaction, the anode sacrifices phosphorous to the Grignard reagent thereby forming the tertiary phosphine.

To conduct the reaction it is necessary the current density be at least 0.1 ampere with amperages of at least 0.3–0.5 being most beneficial. The voltage necessary to generate these amperages in the system depends upon conductivity of the Grignard reagent, the solvent, the type of phosphorous electrode employed as well as other similar electrical considerations. If either the red or the white phosphorous is used as the electrode it will be necessary to employ voltages in excess of 500 volts to produce the necessary current densities.

The solvent used for the Grignard reagent must be relatively inert under the conditions of the process. The solvents used are organic liquids which have di-electric properties but which have sufficient conductivity to permit passage of the current between the anode and the cathode. When the process is operated using solvents such as diethylether and tetrahydrofuran, many of the tertiary phosphines are soluble therein. Other typical solvents which may be used for conducting the reaction are such compounds as dimethyl ether, di-isopropyl ether, and homologs thereof including the well-known polyoxyalkylene diethers and polyethers e.g., the dimethyl ether of diethylene glycol. As can be seen from this representative list of solvents, others may be preferred; particularly those ethers which contain at least four carbon atoms or more, although the number of carbon atoms should not generally exceed more than eight.

Illustrative of the tertiary phosphines that are capable of being prepared by the practices of the invention are the compounds, trimethyl phosphine, triethyl phosphine, triisopropyl phosphine, tributyl phosphine, triisobutyl phosphine, triallyl phosphine, triamyl phosphine, triisoamyl phosphine, tritolyl phosphine, tribenzyl phosphine, diethyl methyl phosphine, dimethyl phenyl phosphine, dimethylethyl phosphine, diethyl propyl phosphine, diethyl phenyl phosphine, and dipropyl phenyl phosphine. This group of phosphines which may be produced by the practices herein described are illustrative. It is obvious that other similar phosphines may be prepared.

It will be noted that the last several compounds listed above contain mixed organic radicals, that is to say, tertiary phosphines may contain the same or different aliphatic radicals or they may contain two aliphatic radicals and one aromatic radical. It is compounds of this type which are referred to herein as mixed tertiary phosphines.

The organic substituent of the Grignard reagent determines the particular tertiary phosphine to be produced. It is believed the reaction that occurs during the electrolysis may be expressed as follows:

$$3RMgHalide + P \rightarrow PR_3 + 3MgHalide$$

A typical experiment to produce triethyl phosphine would be conducted as follows. A conventional electrolysis cell would be set up utilizing as the anode, a pressure formed crystalline black phosphorous rod or sheet. The cathode of the cell would be composed of platinum. Into the cell would be added diethyl ether and ethyl magnesium chloride.

After the reagents have been carefully mixed in the cell they would be nitrogen blanketed, to prevent oxidation of the surface of the phosphorous anode, and sufficient voltage impressed until the current density was at least 0.1 ampere. To prevent the possibility of overheating and volatilization of the reaction components, the Grignard solution could be withdrawn from the cell periodically and recirculated through cooling equipment to maintain the temperature below the boiling point of the ingredients.

The current would be applied for a period of time sufficient to sacrificially remove the phosphorous, e.g., about 8 hours. After the electrolysis is completed it is possible to separate the triethyl phosphine from the diethyl ether by distillation. Alternatively, the mixture may be treated with an aqueous ammonium chloride solution followed by distillation of the organic layer. This latter purification process is sometimes desirable since it will tend to produce higher yields. If the distillation method is employed, after the diethyl ether is removed the temperature would be elevated to approximately 127° C. or higher at which point the liquid triethylphosphine is easily removed. This distillation separates the triethyl phosphine from the ether as well as the magnesium chloride and any other reaction products that have been formed.

When conducting the electrolysis it is beneficial that a molar excess of the Grignard reagent be employed. This excess tends to favor increased yields and also tends to prevent the formulation of acidic materials which are sometimes formed when only exact molar quantities are used. A molar excess of from .5 to 5 mols is usually adequate.

The electrolysis reactions described above proceed smoothly and rapidly. The small amount of electrical current required in producing the tertiary phosphines tends to make the economics of the process favorable.

An important advantage of the invention resides in the fact that when tertiary phosphines having secondary or tertiary carbon atoms attached to the phosphorous are sought to be produced, they may be readily formed by the reactions described. When it is sought to produce these latter types of compounds using a conventional Grignard synthesis only low yields are experienced.

Having thus described my invention it is claimed as follows:

1. A process for preparing tertiary phosphines which comprises electrolyzing between a phosphorus anode and a cathode a substantially anhydrous solution of a Grignard reagent of the formula RMgHalide in a substantially inert solvent for the Grignard reagent, and recovering as an electrolysis product a tertiary phosphine of the formula $R_3P$ where R is an organic radical containing as its major components the elements, carbon and hydrogen.

2. The process of claim 1 where R is an acyclic organic radical which contains not more than 18 carbon atoms.

3. The process of claim 1 where the phosphorus anode is formed of black phosphorous.

4. The process of claim 1 where the substantially inert solvent for the Grignard reagent is an ether which contains at least four carbon atoms and the RMgHalide is a RMgChloride.

5. A process for preparing a tertiary alkyl phosphine which comprises electrolyzing between a black phosphorous anode and a cathode a substantially anhydrous solution of a Grignard reagent of the formula RMgHalide in a substantially inert solvent for the Grignard reagent and recovering as an electrolysis product a tertiary alkyl phosphine of the formula $R_3P$ where R is an aliphatic hydrocarbon radical of from 1 to 8 carbon atoms in chain length.

6. The process of claim 5 where R is a mixed aliphatic hydrocarbon radical.

(References on following page)

References Cited in the file of this patent

UNITED STATES PATENTS 2,265,819 Rosen _____ Dec. 9, 1941

FOREIGN PATENTS 839,172 Great Britain _____ June 29, 1960

OTHER REFERENCES

"Organophosphorus Compounds," Kosolapoff (1950), pages 16–21.

Jones and Gilman: "Chemical Reviews," vol. 54 (October 1954), pages 844–846.